(12) United States Patent
Stapleton et al.

(10) Patent No.: US 12,250,299 B1
(45) Date of Patent: Mar. 11, 2025

(54) SYSTEMS AND METHODS FOR CLASSICAL-QUANTUM ENCRYPTION AND DECRYPTION

(71) Applicant: Wells Fargo Bank, N.A., San Francisco, CA (US)

(72) Inventors: Jeff J. Stapleton, O'Fallon, MO (US); Richard Orlando Toohey, Tempe, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 372 days.

(21) Appl. No.: 17/660,162

(22) Filed: Apr. 21, 2022

(51) Int. Cl.
*H04L 9/08* (2006.01)
*G06N 10/60* (2022.01)

(52) U.S. Cl.
CPC ........... *H04L 9/0852* (2013.01); *G06N 10/60* (2022.01)

(58) Field of Classification Search
CPC .............................. H04L 9/0852; G06N 10/60
See application file for complete search history.

(56) References Cited

U.S. PATENT DOCUMENTS

| | | | |
|---|---|---|---|
| 8,155,318 B2 | 4/2012 | Tsurumaru | |
| 8,744,075 B2 | 6/2014 | Tanaka | |
| 8,897,449 B1 | 11/2014 | Broadbent | |
| 10,152,358 B2 | 12/2018 | Dadashikelayeh et al. | |
| 10,367,638 B2 | 7/2019 | Bitauld et al. | |
| 10,554,390 B2 | 2/2020 | Jain et al. | |
| 10,581,604 B2 | 3/2020 | Mustafa et al. | |
| 10,887,094 B2 | 1/2021 | Ji et al. | |
| 10,951,392 B2 * | 3/2021 | Pivovarov | H04L 9/0869 |
| 11,122,136 B2 | 9/2021 | Griffin et al. | |
| 2018/0183570 A1 * | 6/2018 | Zheng | H04L 9/008 |
| 2019/0182216 A1 | 6/2019 | Gulak et al. | |
| 2020/0394547 A1 | 12/2020 | Cao et al. | |
| 2023/0019214 A1 * | 1/2023 | Prothero | H04L 9/008 |

OTHER PUBLICATIONS

Tahmasbi, Mehrdad, and Matthieu R. Bloch. "A framework for covert and secret key expansion over quantum channels." arXiv preprint arXiv:1811.05626 (2018). (Year: 2018).*

(Continued)

*Primary Examiner* — Luu T Pham
*Assistant Examiner* — Paul J Skwierawski
(74) *Attorney, Agent, or Firm* — K&L Gates LLP

(57) ABSTRACT

Systems, apparatuses, methods, and computer program products are disclosed for classical-quantum encryption and decryption. An example method for classical-quantum encryption includes receiving, by communications hardware, a symmetric key and a plaintext message, generating, by a function generator, an analytic function using the symmetric key and the plaintext message, computing, by a cryptography unit, a ciphertext based on a Taylor series expansion of the analytic function, and outputting the ciphertext. An example method for classical-quantum decryption, the method includes receiving, by communications hardware, a symmetric key and a ciphertext, deriving, by a cryptography unit and using a quantum computer, an analytic function using the ciphertext, generating, by a function generator, a plaintext message using the analytic function and the symmetric key, and outputting the plaintext message.

18 Claims, 7 Drawing Sheets

(56) References Cited

OTHER PUBLICATIONS

Abed, Basim Najim Al-din, and Salam Abdulkhaleq Noaman. "McLaurin series as a new technique to improve encryption process." In Journal of Physics: Conference Series, vol. 1294, No. 4, p. 042008. IOP Publishing, 2019. (Year: 2019).*

Basim Najim Al-Din Abed et al., Mclaurin Series as a New Technique to Improve Encryption Process, 2nd International Science Conference, IOP Conf. Series: Journal of Physics: Conf. Series 1294 (2019).

Salam Abdulkhaleq Noaman et al., A New Mathematical Model to Improve Encryption Process Using Taylor Expansion, 1st. International Conference of Information Technology to Enhance E-Learning and Other Application, ( IT-ELA 2020 ), Baghdad College of Economic Sciences University, Baghdad, Iraq.

Mehrdad Tahmasbi et al., Framework for Covert and Secret Key Expansion Over Classical-Quantum Channels, Phys. Rev. A 99, 052329, May 20, 2019.

Muharrem Tuncay Gençoğlu et al., Enhancing the Data Security by using Audio Steganography with Taylor Series Cryptosystem, Turkish Journal of Science & Technology, 16(1), 47-64, 2021.

* cited by examiner

SYSTEMS AND METHODS FOR CLASSICAL-QUANTUM ENCRYPTION AND DECRYPTION

BACKGROUND

Modern cryptography typically occurs in pairs such as (encrypt, decrypt) or (sign, verify), in which software, firmware, or hardware functions are implemented on classical computers. This paradigm is ubiquitous and forms the basis for secure communications between computing devices.

BRIEF SUMMARY

The advent of quantum computers with cryptanalytic capabilities (e.g., Shor's Algorithm) threatens some asymmetric algorithms such as Rivest-Shamir-Adleman (RSA), Diffie-Hellman (DH), and Elliptic Curve Cryptography (ECC), which are used extensively today. Accordingly, the U.S. National Institute of Standards and Technology (NIST) has initiated a Post-Quantum Cryptography (PQC) program with the goal of selecting PQC algorithms that may mitigate the vulnerability to quantum computers. The PQC algorithms under investigation are believed to be resistant to cryptanalysis performed on a quantum computer while still operating on a classical computer.

However, yet-to-be-invented quantum algorithms might affect other types of classical cryptography, such as the Advanced Encryption Standard (AES), or potentially any of the PQC algorithms that NIST may potentially select. Cryptography is always evolving, since its inception with the Egyptian priesthood's secret hieroglyphics (circa 1900 BC), and as new quantum algorithms are developed and released, it is potentially the case that these new quantum algorithms will reveal that the classical cryptography techniques in use or under investigation today are also vulnerabilities to a quantum computer. Consequently, the ability to balance cryptographic processes between classical computers and developing quantum computers is an important construct for future security controls.

Example embodiments set forth herein create a new paradigm for securely protecting information by requiring the use of both classical and quantum computers. At a high level, example embodiments contemplate deployment of a first cryptographic function F(x) and its inverse F'(x) being performed on different systems, such that one function is done on a classical computer C and the other is done using a quantum computer Q. As described herein, an encryption function is performed on a classical computer but its inverse (decryption) is performed using a quantum computer (e.g., C(F(x)) is encryption and Q(F'(x)) is decryption). Because it is not possible to predict whether new quantum algorithms will reveal vulnerabilities in classical encryption schemes, example embodiments avoid this risk by setting forth an encryption scheme that actively requires use of a quantum computer for decryption. In this fashion, example embodiments therefore set forth a new paradigm for asymmetric cryptography, wherein encryption is performed using classical computing infrastructure while decryption requires a quantum computer.

In one example embodiment, a method is provided for classical-quantum encryption. The method includes receiving, by communications hardware, a symmetric key and a plaintext message, generating, by a function generator, an analytic function using the symmetric key and the plaintext message, computing, by a cryptography unit, a ciphertext based on a Taylor series expansion of the analytic function, and outputting the ciphertext.

In a corresponding example embodiment, a method is provided for classical-quantum decryption. The method includes receiving, by communications hardware, a symmetric key and a ciphertext, deriving, by a cryptography unit and using a quantum computer, an analytic function from the ciphertext, generating, by a function generator, a plaintext message using the analytic function and the symmetric key, and outputting the plaintext message.

In another example embodiment, an apparatus is provided for classical-quantum encryption. The apparatus includes communications hardware configured to receive a symmetric key and a plaintext message, a function generator configured to generate an analytic function using the symmetric key and the plaintext message, and a cryptographic unit configured to compute a ciphertext based on a Taylor series expansion of the analytic function, wherein the communications hardware is further configured to output the ciphertext.

In a corresponding example embodiment, an apparatus is provided for classical-quantum decryption. The apparatus includes communications hardware configured to receive a symmetric key and a ciphertext, a cryptography unit configured to derive, using a quantum computer, an analytic function from the ciphertext, and a function generator configured to generate a plaintext message using the analytic function and the symmetric key, wherein the communications hardware is further configured to output the plaintext message.

In another example embodiment, a computer program product is provided for classical-quantum encryption. The computer program product includes at least one non-transitory computer-readable storage medium storing software instructions that, when executed, cause an apparatus to receive a symmetric key and a plaintext message. The software instructions, when executed, further cause the apparatus to generate an analytic function using the symmetric key and the plaintext message, compute a ciphertext based on a Taylor series expansion of the analytic function, and output the ciphertext.

In a corresponding example embodiment, a computer program product is provided for classical-quantum decryption. The computer program product includes at least one non-transitory computer-readable storage medium storing software instructions that, when executed, cause an apparatus to receive a symmetric key and a ciphertext. The software instructions, when executed, further cause the apparatus to derive, using a quantum computer, an analytic function from the ciphertext, generate a plaintext message using the analytic function and the symmetric key, and outputting the plaintext message.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale.

Some embodiments may include fewer or more components than those shown in the figures.

DETAILED DESCRIPTION

Figure 1:
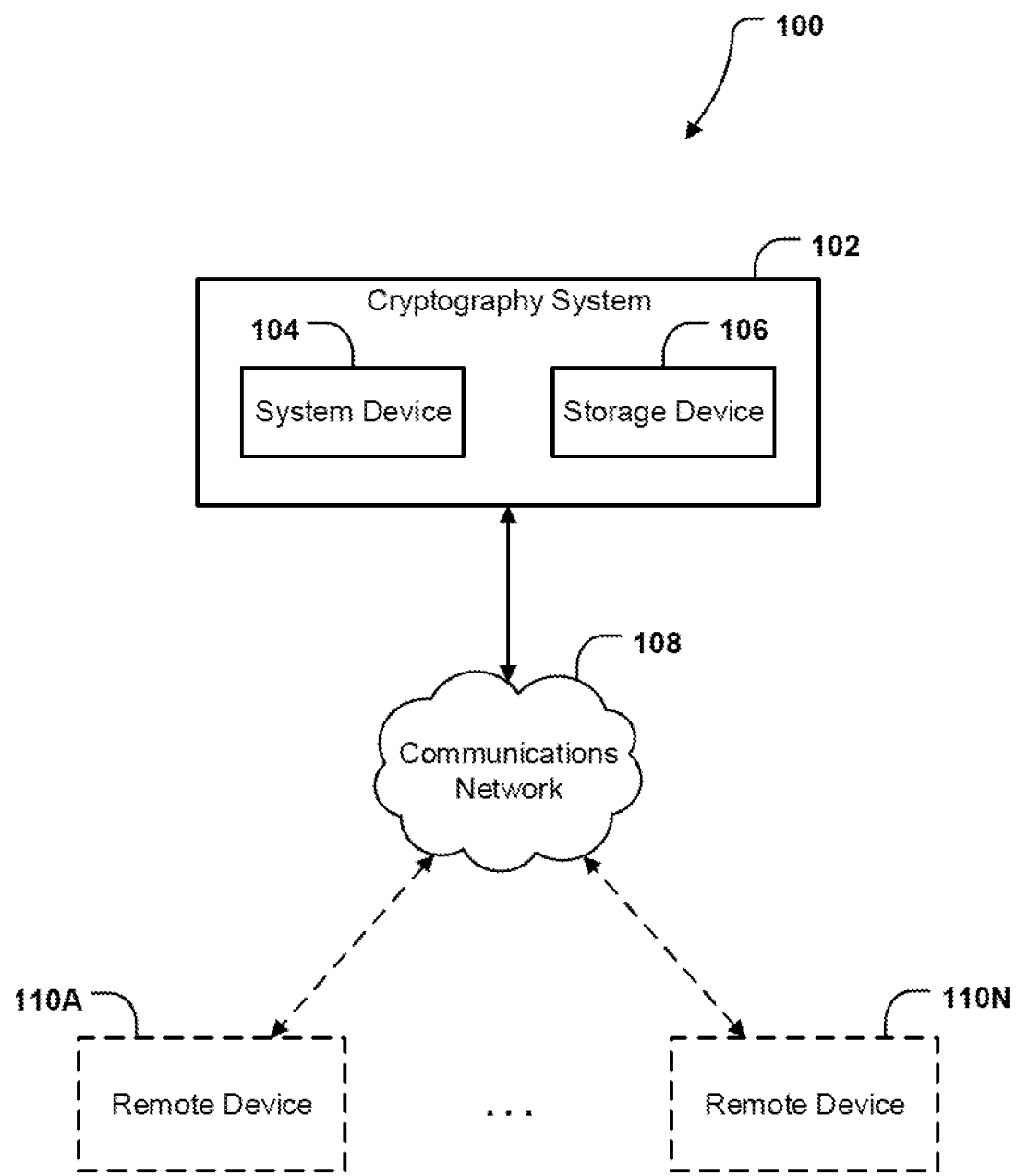
FIG. 1 illustrates a system in which some example embodiments may be used for classical-quantum encryption.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server.

Overview

As noted above, methods, apparatuses, systems, and computer program products are described herein that provide for classical-quantum cryptography. An encryption function is performed on a classical computer but its inverse (decryption) is performed using a quantum computer (e.g., C(F(x)) is encryption and Q(F'(x)) is decryption).

At a high level, example steps enabling these functions are the following. An initial entity, Alice, uses a symmetric key to encode a plaintext message into an analytic function representative of the plaintext message. In some embodiments, this is done through use of a function generation table that maps certain plaintext inputs to analytic function component outputs. After generation of the analytic function, Alice performs a Taylor series expansion of the analytic function.

The Taylor Series Expansion is a commonly used tool in computation and analytic/applied mathematics. The Taylor series is given by:

$$f(x) = \sum \frac{f^{(n)}(a)}{n!}(x-a)^n$$

Performing this transformation is an easy problem for computers, given some differentiable function. For example if one wanted to compute sin(15), a computer will calculate the Taylor series for sin(x=15). This expansion is:

$$\sin(x) \approx x - \frac{1}{3!}x^3 + \frac{1}{5!}x^5 - \frac{1}{7!}x^7 + \ldots$$

This transformation therefore takes any arbitrarily complex, differentiable function and approximates it as a polynomial series. For a more complex example, one could use $f(x) = e^{\sin(x)}$. Once having formed the Taylor series, the function can be completely described through knowledge of the coefficients of the Taylor series: $\{\alpha_1, \alpha_2, \ldots, \alpha_n\}$. Note that most Taylor series are infinite series, and computers truncate the series to match their degree of precision. But while computation of a Taylor series is easy for a computer, it is very hard for a computer to start from a Taylor series and generate the analytic function that the Taylor series approximates. Accordingly, example embodiments leverage the inherent difficulty of generating a Taylor series to prevent codebreaking.

Having generated a Taylor series for the analytic function, Alice may thereafter store the set of coefficients that describe the Taylor series as a ciphertext.

To decrypt the ciphertext, an entity Bob (which may or may not be different from Alice), must use a quantum computer. First, from the ciphertext, Bob recreates the Taylor series, and then derives, using a quantum computer, the analytic function. To do this, Bob uses a quantum graph similarity algorithm to generate a graph kernel, and then uses a quantum phase estimation algorithm to minimize the kernel and identify the analytic function representative of the plaintext message. Having the analytic function, Bob uses the symmetric key to decrypt the message by recreating the plaintext message from the analytic function.

Accordingly, through the use of the one-way structure of the Taylor series expansion, example embodiments enable encryption of a message on a classical computer in a way that can only be decrypted using a quantum computer.

Although a high level explanation of the operations of example embodiments has been provided above, specific details regarding the configuration of such example embodiments are provided below.

System Architecture

Example embodiments described herein may be implemented using any of a variety of computing devices or servers. To this end, FIG. 1 illustrates an example environment 100 within which various embodiments may operate. As illustrated, the various operations performed within environment 100 may be orchestrated by a cryptography system 102. The cryptography system 102 may include a system device 104 in communication with a storage device 106. Although system device 104 and storage device 106 are described in singular form, some embodiments may utilize more than one system device 104 and/or more than one storage device 106. Additionally, some embodiments of the cryptography system 102 may not require a storage device 106 at all. Whatever the implementation, the cryptography system 102, and its constituent system device(s) 104 and/or storage device(s) 106 may receive and/or transmit information via communications network 108 (e.g., the Internet) with any number of other devices (e.g., one or more remote devices 110A-110N).

System device 104 may be implemented as one or more servers, which may or may not be physically proximate to other components of cryptography system 102. Furthermore, some components of system device 104 may be physically proximate to the other components of cryptography system 102 while other components are not. System device 104 may receive, process, generate, and transmit data, signals, and electronic information to facilitate the operations of the cryptography system 102. Particular components of system device 104 are described in greater detail below with reference to apparatus 200 in connection with FIG. 2.

Storage device 106 may comprise a distinct component from system device 104, or may comprise an element of system device 104 (e.g., memory 204, as described below in connection with FIG. 2). Storage device 106 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 108). Storage device 106 may host the software executed to operate the cryptography system 102. Storage device 106 may store information relied upon during operation of the cryptography system 102, such as various data sets (e.g., sets of analytic function components that may be utilized by the cryptography system 102), and/or rules sets that may be predefined or curated by an administrator to govern operation of the cryptography system 102 (e.g., to specify or predefine the manner by which a symmetric key may be used to generate an analytic function, and/or in implementations relying upon a function generation table, to specify characteristics of the function generation table). Storage device 106 may also store data that may facilitate performance of operations by the cryptography system 102, such as symmetric keys, function generation tables, ciphertext, or potentially even plaintext messages in certain embodiments. In addition, storage device 106 may store control signals, device characteristics, and access credentials enabling interaction between the cryptography system 102 and one or more of the remote devices 110A-110N.

Each of the one or more remote devices 110A-110N may be embodied by any computing devices, such as desktop or laptop computers, tablet devices, smartphones, or the like. The remote devices 110A-110N need not themselves be independent devices, but may be peripheral devices communicatively coupled to still other computing devices.

Although FIG. 1 illustrates an environment and implementation in which the cryptography system 102 interacts with one or more remote devices 110A-110N, it is not essential that any remote devices 110A-110N be involved in implementations described herein, and a user (e.g., an administrator of the cryptography system 102) may directly interact with the cryptography system 102 (e.g., via communications hardware of system device 104). Whether by way of direct interaction or via indirect interaction via remote devices 110A-110N, users may communicate with, operate, control, modify, or otherwise interact with the cryptography system 102 to perform the various functions and achieve the various benefits described herein.

Example Implementing Apparatuses

Figure 2:
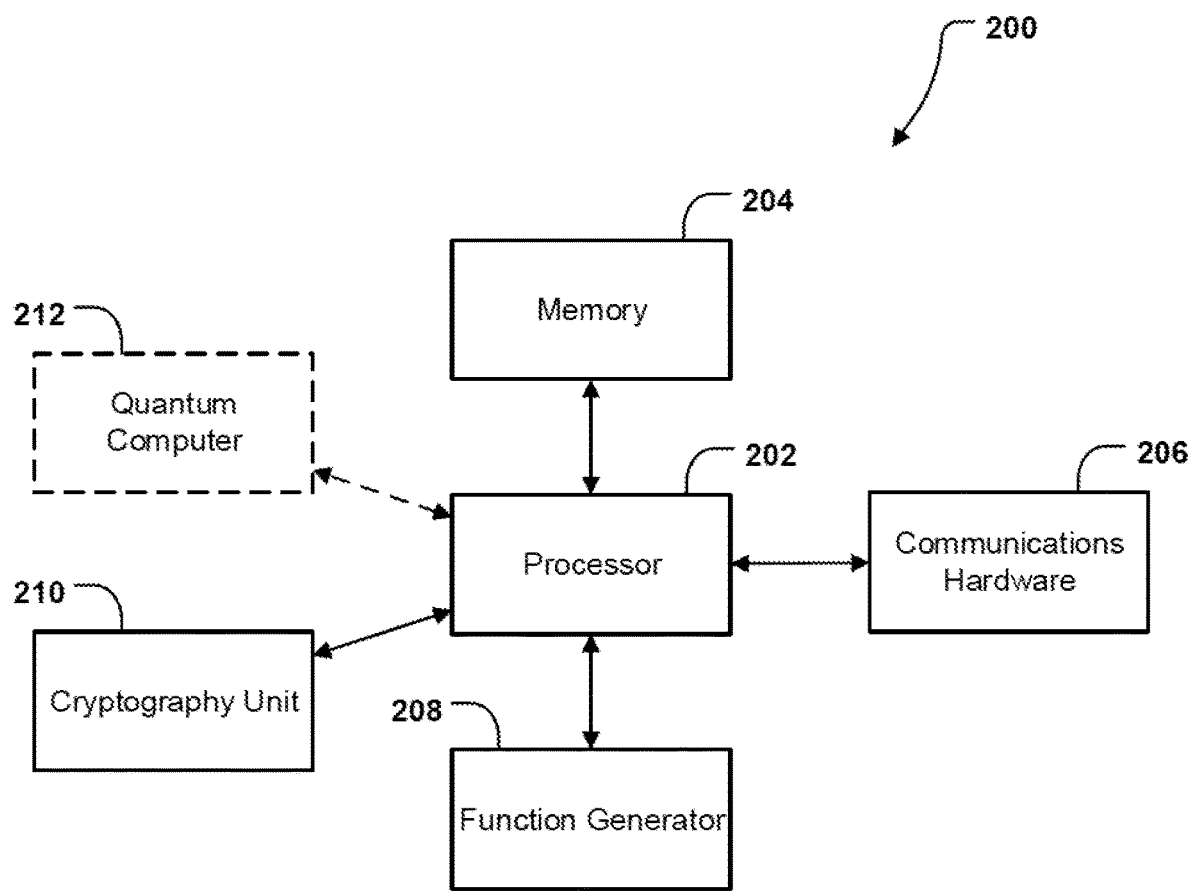
FIG. 2 illustrates a schematic block diagram of example circuitry embodying a device that may perform various operations in accordance with some example embodiments described herein.

System device 104 of the cryptography system 102 (described previously with reference to FIG. 1) may be embodied by one or more computing devices or servers, shown as apparatus 200 in FIG. 2. As illustrated in FIG. 2, the apparatus 200 may include processor 202, memory 204, communications hardware 206, function generator 208, cryptography unit 210, and for decrypting of ciphertext, a quantum computer 212, each of which will be described in greater detail below. While the various components are only illustrated in FIG. 2 as being connected with processor 202, it will be understood that the apparatus 200 may further comprises a bus (not expressly shown in FIG. 2) for passing information amongst any combination of the various components of the apparatus 200. The apparatus 200 may be configured to execute various operations described above in connection with FIG. 1 and below in connection with FIGS. 3-7.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor (e.g., software instructions stored on a separate storage device 106, as illustrated in FIG. 1). In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processing circuitry for causing transmission of such signals to a network or for handling receipt of signals received from a network.

The communications hardware 206 may further be configured to provide output to a user and, in some embodiments, to receive an indication of user input. In such embodiments, the communications hardware 206 may comprise a user interface, such as a display, and may further comprise the components that govern use of the user interface, such as a web browser, mobile application, dedicated client device, or the like. In some embodiments, the communications hardware 206 may include a keyboard, a mouse, a touch screen, touch areas, soft keys, a microphone, a speaker, and/or other input/output mechanisms. The communications hardware 206 may utilize the processor 202 to control one or more functions of one or more of these user interface elements through software instructions (e.g., application software and/or system software, such as firmware) stored on a memory (e.g., memory 204) accessible to processor 202.

In addition, the apparatus 200 further comprises a function generator 208 that generates an analytic function from a plaintext message or generates a plaintext message from an analytic function. The function generator 208 may utilize processor 202, memory 204, or any other hardware component included in the apparatus 200 to perform these operations, as described in connection with FIGS. 3-7 below. The function generator 208 may further utilize communications hardware 206, to gather data from a variety of sources (e.g., a storage device 106 and/or any of remote devices 110A-110N, as shown in FIG. 1), and/or exchange data with a user. For instance, the function generator 208 may utilize communications hardware 206 to exchange a function generation table, symmetric key, plaintext message, or analytic function with a storage device or remote device.

In addition, the apparatus 200 further comprises a cryptography unit 210 that computes a ciphertext based on a Taylor series expansion of an analytic function, or derives a Taylor series from a received ciphertext. The cryptography unit 210 may utilize processor 202, memory 204, quantum computer 212, or any other hardware component included in the apparatus 200 to perform these operations, as described in connection with FIGS. 3-7 below. The cryptography unit 210 may further utilize communications hardware 206, to gather data from a variety of sources (e.g., a storage device 106 and/or any of remote devices 110A-110N, as shown in FIG. 1), and/or exchange data with a user. For instance, the cryptography unit 210 may utilize communications hardware 206 to exchange a ciphertext with a storage device or remote device.

Finally, the apparatus 200 may further comprise a quantum computer 212 for deriving an analytic function from a Taylor series. The quantum computer 212 may be any type of computing device that harnesses the collective properties of quantum states in a manner enabling performance of a quantum graph similarity algorithm and a quantum phase estimation algorithm, such as those described below in connection with FIG. 6. The quantum computer 212 may comprise a series of quantum circuits housing qubits, upon which operations are performed via quantum gates. The quantum computer 212 may utilize a classical computer (e.g., processor 202, memory 204, or any other hardware component included in the apparatus 200 or separate dedicated classical computing infrastructure) to execute software instructions that send instructions to the quantum circuits to execute quantum algorithms. As contemplated herein, these quantum algorithms may be those described in connection with FIGS. 5-7 below, although other algorithms for deriving an analytic function from a Taylor series may additionally, or alternatively, be deployed by the quantum computer 212. The quantum computer 212 may be physically separated from the other components of apparatus 200 for practical reasons (e.g., it may be physically disposed in a location at a specific controlled temperature). The quantum computer 212 may exchange analytic function and/or Taylor series with cryptography unit 210. Further, the quantum computer 212 may in some embodiments be a separate device from the apparatus 200, and therefore may communicate with the cryptography system 102 (e.g., system device 104 and/or storage device 106) via communications network 108, and may exchange information with the system device 104 (i.e., apparatus 200) via communications hardware 206 of the apparatus 200.

Although components 202-212 are described in part using functional language, it will be understood that the particular implementations necessarily include the use of particular hardware. It should also be understood that certain of these components 202-212 may include similar or common hardware. For example, the function generator 208, cryptography unit 210 and quantum computer 212 may each at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the term "circuitry" with respect to elements of the apparatus shall be interpreted as necessarily including the particular hardware configured to perform the functions associated with the particular element being described. Of course, while the term "circuitry" should be understood broadly to include hardware, in some embodiments, the term "circuitry" may in addition refer to software instructions that configure the hardware components of the apparatus 200 to perform the various functions described herein.

Although the function generator 208, cryptography unit 210, and quantum computer 212 may leverage processor 202, memory 204, and/or communications hardware 206 as described above, it will be understood that any of these elements of apparatus 200 may include dedicated hardware to perform its corresponding functions. For instance, the function generator 208 and cryptography unit 210 may utilize one or more dedicated processor, specially configured field programmable gate array (FPGA), or application specific interface circuit (ASIC), and may accordingly leverage processor 202 executing software stored in a memory (e.g., memory 204), memory 204, or communications hardware 206 for enabling any functions not performed by special-purpose hardware elements. Quantum computer 212, of course, necessarily leverages specific and unique hardware elements separate and apart from those elements utilized in a classical computer. In all embodiments, however, it will be understood that the function generator 208, cryptography unit 210, and quantum computer 212 are implemented via particular machinery designed for performing the functions described herein in connection with such elements of apparatus 200.

In some embodiments, various components of the apparatus 200 may be hosted remotely (e.g., by one or more cloud servers) and thus not all components must be part of a single connected physical element. Moreover, some or all of the functionality described herein may be provided by third party circuitry. For example, apparatus 200 may access one or more third party circuitries via any sort of networked connection (e.g., communications network 108). In turn, some components of apparatus 200 may be in remote communication with other components describe above as comprising the apparatus 200.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200, that loading the software instructions onto a computing device or apparatus produces a special-purpose machine comprising the means for implementing various functions described herein.

Having described specific components of an example apparatus 200, example embodiments are described below in connection with a series of graphical user interfaces and flowcharts.

Example Operations

Turning to FIGS. 3-7, example flowcharts are illustrated that contain example operations for cryptographic operations in accordance with various example embodiments described herein. The operations illustrated in FIGS. 3 and 4 will be described first. These operations may, for example, be performed by a device that encrypts a plaintext message, which may be embodied by system device 104 of the cryptography system 102 shown in FIG. 1, and which may in turn be embodied by an apparatus 200, which is shown and described in connection with FIG. 2. To perform the operations described below, the apparatus 200 may utilize one or more of processor 202, memory 204, communications hardware 206, a function generator 208, a cryptography unit 210, and/or any combination thereof. Notably, the apparatus 200 that performs the operations set forth in FIGS. 3 and 4 need not include or utilize a quantum computer.

Figure 3:
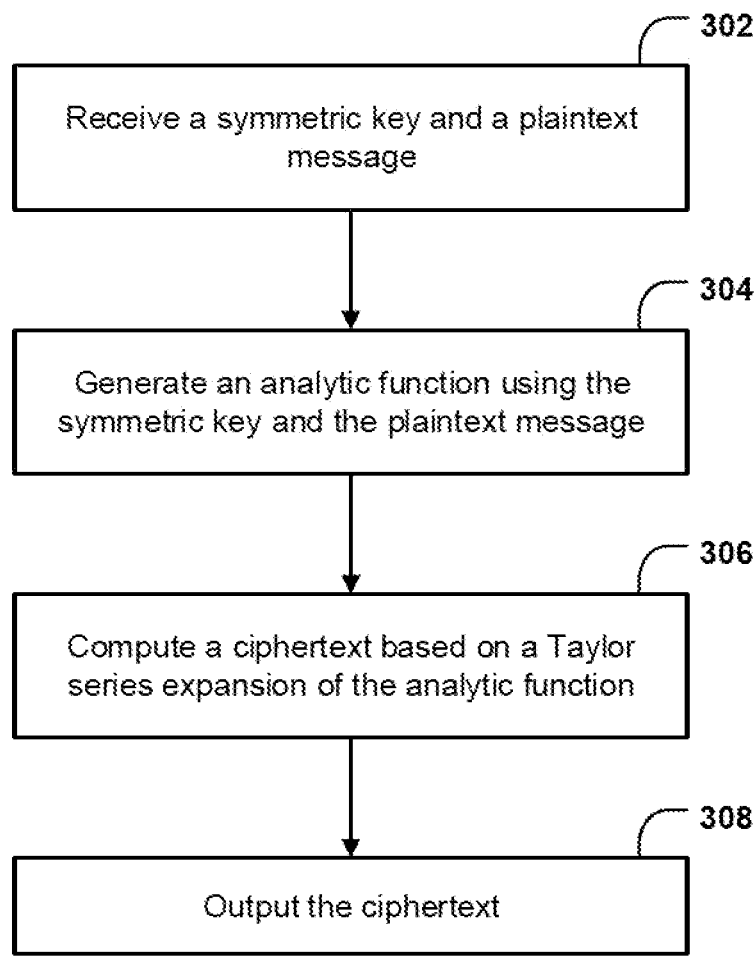
FIG. 3 illustrates an example flowchart for encrypting a plaintext message using a classical-quantum encryption approach, in accordance with some example embodiments described herein.

Turning first to FIG. 3, operation 302 illustrates that the apparatus 200 includes means, such as processor 202, memory 204, communications hardware 206, or the like, for receiving a symmetric key and a plaintext message. The symmetric key may be retrieved from a memory (e.g., memory 204 or a remote storage device). Alternatively, the symmetric key may be received via communications hardware 206. For instance, the symmetric key may be received from a user interacting with the apparatus 200 (e.g., by the user manually engaging with the apparatus 200 via a user interface, or by the user plugging a USB key or other similar portable storage device into the apparatus 200 and causing transfer of the symmetric key from the USB key or portable storage device to the apparatus 200). As another example, the symmetric key may be received via communications hardware 206 from another device remote from the apparatus 200, such as a third party device (e.g., any of the remote devices 110A-110N shown in FIG. 1). In some implementations, the symmetric key may be generated by the apparatus 200, (e.g., by the processor 202). A more detailed description of one embodiment for generating the symmetric key is provided below in connection with operation 404.

The symmetric key is used to generate an analytic function, as described below in connection with operation 304. At a general level, the symmetric key comprises any input that may be used by the function generator 208 in connection with a plaintext message to enable generation of an analytic function. For instance, the symmetric key may be a random or pseudorandom number. Alternatively, in implementations using a function generation table, the symmetric key may specify an arrangement of analytic function components in each column-row pair of the function generation table, as described in greater detail below in connection with FIG. 4.

As with the symmetric key, the plaintext message may also be received in any of a variety of ways. For instance, the plaintext message may be retrieved from a memory (e.g., memory 204 or a remote storage device). Alternatively, the plaintext message may be received via communications hardware 206. For instance, the plaintext message may be received from a user interacting with the apparatus 200 (e.g., by the user manually engaging with the apparatus 200 via a user interface, or by the user plugging a USB key or other similar portable storage device into the apparatus 200 and causing transfer of the plaintext message from the USB key or portable storage device to the apparatus 200). As another example, the plaintext message may be received via communications hardware 206 from another device remote from the apparatus 200, such as a third party device (e.g., any of the remote devices 110A-110N shown in FIG. 1). Similarly, the plaintext message may be generated by the apparatus 200.

And although the symmetric key must comprise a set of data usable by the function generator 208 in connection with a plaintext message to enable generation of an analytic function, the plaintext message need not comprise any specific type of data. Rather, the contents of the plaintext message may comprise any sequence of data (e.g., bits) for which encryption is desired.

As shown in operation 304, the apparatus 200 includes means, such as function generator 208 or the like, for generating an analytic function using the symmetric key and the plaintext message. As part of generating the analytic function, function generator 208 may deploy one or more checks to ensure that the analytic function is differentiable. For instance, the function generator 208 may generate a first analytic function candidate, and then may determine whether the first analytic function candidate is differentiable. If not, operation 304 may involve the function generator 208 generating a second analytic function candidate and determining whether the second analytic function candidate is differentiable. This process may repeat until the function generator 208 identifies an analytic function candidate that is differentiable. Upon confirming differentiability of an analytic function candidate, the analytic function candidate may then be selected by the function generator as the analytic function and the procedure may advance to operation 306.

As far as how the analytic function is generated from a symmetric key and a plaintext message, any of a variety of methods may be used. One example implementation for this process utilizes a function generation table, and will now be described in connection with FIG. 4.

Figure 4:
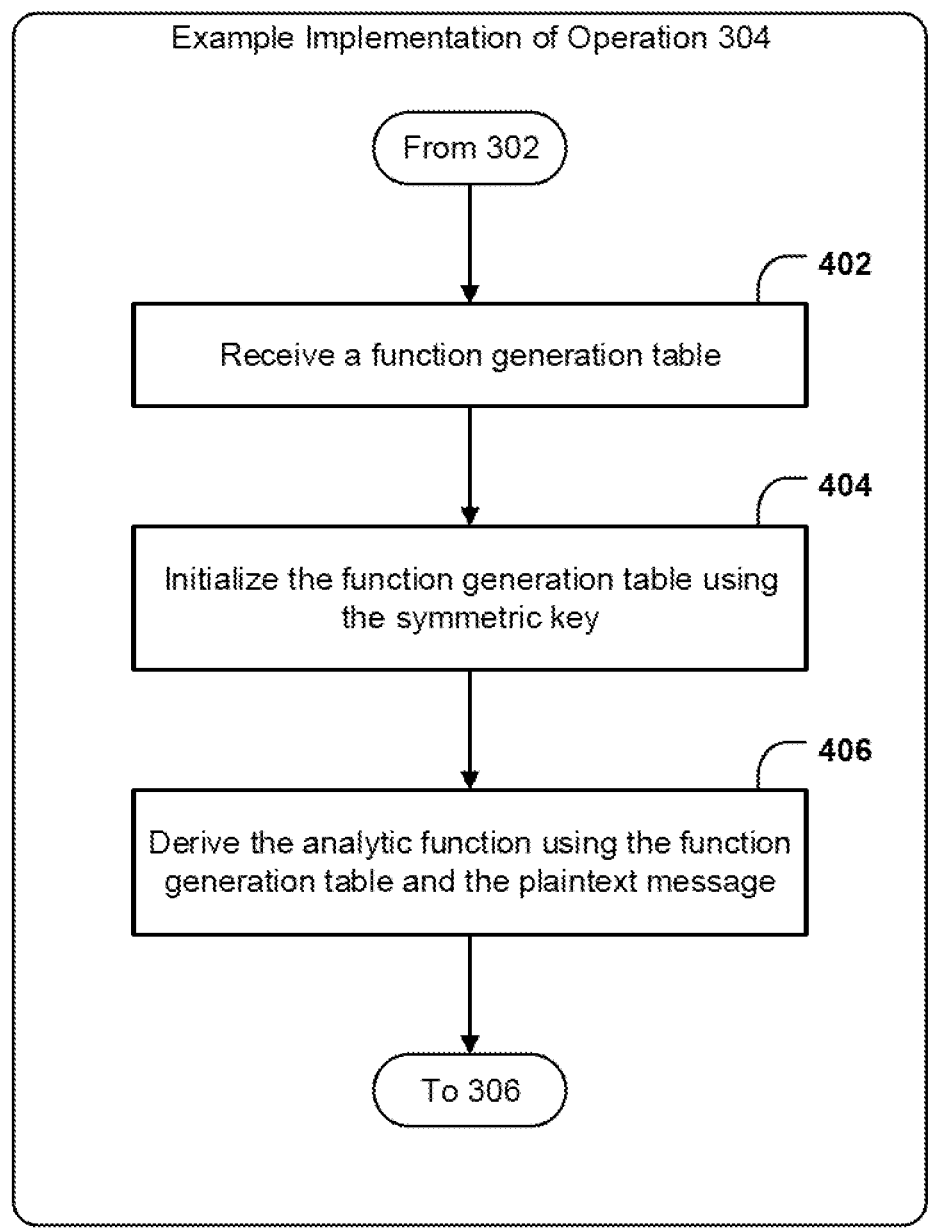
FIG. 4 illustrates an example flowchart for generating an analytic function using a symmetric key and a plaintext message, in accordance with some example embodiments described herein.

Turning to FIG. 4, operation 402 illustrates that the apparatus 200 includes function generator 208 or the like, for receiving a function generation table, which comprises a table having a set of columns and a set of rows. Each specific column-row pair in the function generation table identifies a field containing an analytic function component. To this end, an analytic component may be a discrete analytic function element that may be used in combination with other analytic components to form an analytic function. An analytic function component may itself be an analytic function. An analytic function component may also comprise an operator or other element that may link together two analytic functions. The set of possible analytic function components may be standardized using object identifiers (OID) to provide universal uniqueness for industry interoperability.

An example function generation table is provided in Table 1 below.

TABLE 1

Function Generation Table

| $1^{st}$ section | $2^{nd}$ section | $3^{rd}$ section | $4^{th}$ section | $5^{th}$ section | ... |
|---|---|---|---|---|---|
| e | + | sin(x) | + | sin(x) | ... |
| cos(x) | − | cos(x) | − | cos(x) | ... |
| tan (x) | * | tan (x) | * | tan (x) | ... |
| x | ÷ | x | ÷ | x | ... |
| sin(x) | ^ | e | ^ | e | ... |
| ln (x) | √ | ln (x) | √ | ln (x) | ... |
| sinh (x) | ... | sinh (x) | ... | sinh (x) | ... |
| ... | | ... | | ... | ... |

As can be seen, the example function generation table shown above includes five illustrated columns, although there may be any number of columns in a given function generation table. Similarly, this example function generation table includes seven rows, although any number of rows may exist in a given function generation table. Each field identified by a column-row pair contains an analytic function component, which may be leveraged to produce an analytic function from a symmetric key and a plaintext message.

The ordering of the analytic function components within a given column of the function generation table may be predefined in some fashion, and then re-arranged based on the symmetric key (a process referred to below as initialization of the function generation table). As an analogy, one can think of each column of the function general table as a stack of cards that can be shuffled prior to encryption of a message. To decrypt the message, one must need to know the exact composition and ordering of the stacks.

In operation 402, the function generation table may be retrieved by function generator 208 from a memory (e.g., memory 204 or a remote storage device). Alternatively, the function generation table may be received by the function generator 208 via communications hardware 206, either via engagement of a user with the apparatus 200 or via interaction between the apparatus 200 and a separate device (e.g., any of the remote devices 110A-110N shown in FIG. 1). The function generation table may be received from a user via communications hardware 206 by the user manually engaging with the apparatus 200 via a user interface comprising the communications hardware 206 or by the user plugging a USB key or other similar portable storage device into communications hardware 206 of the apparatus 200 and causing transfer of the plaintext message from the USB key or other portable storage device to the apparatus 200. The function generation table may be received via communications hardware 206 from another device, such as any of the remote devices 110A-110N shown in FIG. 1, via a communications network (e.g., communications network 108 shown in FIG. 1).

In some embodiments, the function generation table may be generated by the apparatus 200 and not received from a user or other device. In such embodiments, the function generator 208 may generate the function generation table from a series of predefined analytic function components stored in a memory (e.g., memory 204 or a separate storage device 106, as shown in FIG. 1). Alternatively, the function generator 208 may generate the function generation table from a set of analytic function components received via communications hardware 206 from a user or other device. Similarly, the apparatus 200 may have access to predefined settings regarding the size (i.e., number of columns and rows) of the function generation table (which may be stored in a memory such as memory 204 or a separate storage device 106, as shown in FIG. 1), or the size of the function generation table may be received via communications hardware 206 from a user or other device.

Once the analytic function components and size of the function generation table are received, the function generator 208 may randomly or pseudorandomly allocate the analytic function components to the various column-row pairs of the function generation table to complete the creation of the function generation table. To do this, the function generator 208 may allocate (randomly, pseudorandomly, or as directed by a user, third party device, or predefined rule set) a subset of analytic function components to each column of the function generation table, and then, for each column, may generate a permutation of the subset of analytic function components that defines the ordering of the subset within the column of the function generation table.

The initial allocation of analytic function components in the fields of the function generation table may be selected in a manner defined by the received symmetric key, or it may be defined by the function generator 208, and may thereafter be used to generate the symmetric key (in such embodiments, the symmetric key is therefore received in operation 302 from the function generator 208 as a result of creation of the function generation table). When the function generator 208 defines the initial allocation of analytic function components into the function generation table, the function generator 208 may do this randomly (or pseudorandomly), such as through use of a brute force method (e.g., randomly or pseudorandomly selecting a first analytic function component in the subset, then randomly or pseudorandomly selecting a second analytic function component, and so forth, until all of the analytic functions have been selected, with the order of selection defining the ordering of the analytic function components in the column).

As shown in operation 404, the apparatus 200 includes means, such as function generator 208 or the like, for initializing the function generation table using the symmetric key. As noted previously, in some embodiments, the function generator 208 may initialize the function generation table by re-arranging, based on the symmetric key, which analytic function components are contained in the fields identified by the column-row pairs in the function generation table. In this regard, a portion of the symmetric key may correspond to each column of the function generation table, such that the portion of the symmetric key for a given column defines the ordering of the analytic function components in that column. In such embodiments, a separate data structure may be needed that defines the subset of constituent analytic function components that are in each column, such that the combination of this portion of the symmetric key with the subset of constituent analytic function components will together define the contents and ordering of each column in the function generation table. In some embodiments, this portion of the symmetric key may itself define the subset of constituent analytic function components in the column as well as the ordering thereof, such that this portion of the symmetric key essentially defines the entirety of its corresponding column of the function generation table. Collectively, the symmetric key therefore may be used to define how to re-arrange the analytic function component contained within each field identified by each column-row pair in the function generation table. Of course, where the function generation table is created by the function generator 208 rather than received in another way, operation 404 may be performed organically as part of the creation of the function generation table.

As shown in operation 406, the apparatus 200 includes means, such as function generator 208 or the like, for deriving an analytic function using the function generation table and the plaintext message. In some embodiments, deriving the analytic function includes the function generator 208 partitioning the plaintext message into a series of bit groups. For each bit group, the function generator 208 may select an appropriate column-row pair from the function generation table. In this regard, the function generator 208 may select a column for the column-row pair based on an ordering of the bit group within the series of bit groups and an ordering of the column within the function generation table. For instance, the first bit group in the series may correspond to the first column in the function generation table, the second bit group may correspond to the second column, and so forth (of course, it will be understood that any other appropriate correspondence may be assigned as well, and in some embodiments the assignment of bit groups to columns may be made by the function generator 208 based on additional data stored in the symmetric key). The function generator 208 may select a row for the column-row pair based on a numerical value of the bit group. In this regard, each bit group comprises a sequence of bits representing a numerical value, and this numerical value may define an offset into the column that identifies the row for the bit group. Following selection of an appropriate column-row pair for the bit group, the function generator 208 may select the analytic function component contained in a field identified by the appropriate column-row pair. This analytic function component may thus comprise the ciphertext corresponding to the bit group.

To provide an example, an example plaintext message M may comprise the binary string '1111 0100 1110 0101 1111 0011 1111 0100'. This binary string may be partitioned into a series of bit groups having a predefined number of bits. For ease of explanation, assuming that each bit group has four bits, the first bit group comprises '1111'. Because it is the first bit group, the appropriate column may be the $1^{st}$ column (although another column may be selected based in embodiments where the allocation of columns is done in another way defined by the symmetric key). And because the bit string '1111' has a decimal value of 15, the appropriate row for this first bit group is the 15th row. Accordingly, the analytic function component for this first bit group comprises the analytic function component identified by the column-row pair [1,15] in the function generation table. The second bit group comprises '0100', which has a decimal value of 4. Accordingly, the analytic function component for this second bit group comprises the analytic function component identified by the column-row pair [2,4] in the function generation table. The process may be iteratively repeated until all of the analytic function components have been selected based on the series of bit groups.

Following generation of the analytic function components for all of the bit groups in the series of bit groups, the function generator 208 may concatenate all of the selected analytic function components to derive the analytic function. And following derivation of the analytic function in operation 406, the procedure thereafter returns to operation 306 to continue with the encryption process.

As shown in operation 306, the apparatus 200 includes means, such as cryptography unit 210 or the like, for computing a ciphertext based on a Taylor series expansion of the analytic function. In some embodiments, cryptography unit 210 may compute the ciphertext by computing the Taylor series expansion of the analytic function, and then selecting a set of coefficients that describe a Taylor series produced by the Taylor series expansion. The ciphertext therefore comprises the selected set of coefficients. The number of coefficients that may be selected to describe the Taylor series may be predefined by the apparatus 200, or may be selected by a user or included as a component defined by a respective portion of the symmetric key.

Finally, as shown in operation 308, the apparatus 200 includes means, memory 204, communications hardware 206, or the like, for outputting the ciphertext. For instance, the ciphertext may be stored in memory 204, stored in a separate storage device (e.g., storage device 106 shown in FIG. 1 or a remote storage device), or may be transmitted via communications hardware 206 to a user, to a portable memory device (e.g., a USB key or the like), or transmitted to a separate device (e.g., any of remote devices 110A-110N). In addition to outputting the ciphertext, the apparatus 200 may output the symmetric key, and in embodiments where the symmetric key does not also define the function generation table, indicia of the function generation table used to generate the analytic function.

Encryption of a plaintext message into a ciphertext in this fashion provides unique benefits based on the manner by which the encryption is performed. As has been described previously, deriving an analytic function from a Taylor series expansion is not possible using classical computing resources. Accordingly, even if one were to know the symmetric key and the manner by which the function generator operates, one could not decrypt a ciphertext generated in the manner set forth in FIGS. 3 and 4 without access to a sufficiently robust quantum computer. And even with access to a sufficiently robust quantum computer, one would also need access to the symmetric key and would need knowledge of the manner by which the function generator operates. Accordingly, technological roadblocks will prevent all but the most sophisticated and advanced attackers from having even the possibility of compromising data encrypted in the manner set forth in FIGS. 3 and 4; thus, data can be reliably secured in this fashion even in locations or data stores that may themselves be compromised or exposed to malicious actors. Example scenarios that may benefit from the various embodiments set forth herein include those involving personally identifiable information (PII) or personal health information (PHI), which is a type of information that in may carry durable relevance for an individual's entire lifetime, and for which durable security against future threats therefore has substantial value. A data controller or data processor (e.g., an entity responsible for appropriately managing data under the General Data Protection Regulation (GDPR), California Consumer Privacy Act (CCPA), or another jurisdictions' privacy laws or regulations) might use example embodiments described herein to encrypt sensitive PII or PHI such that only a separate receiver can decrypt the data, regardless of cryptanalysis capability using classical computer or quantum computers. The data controller or data processor might similarly use these techniques to enable the long-term storage of PII or PHI in a robust manner.

Figure 5:
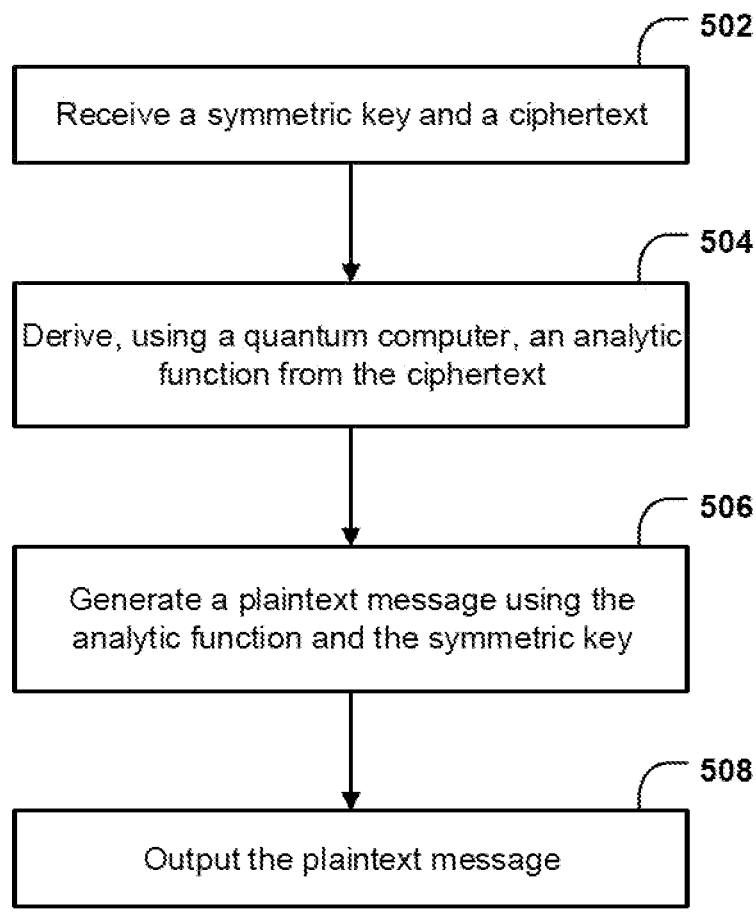
FIG. 5 illustrates an example flowchart for decrypting a plaintext message using a classical-quantum encryption approach, in accordance with some example embodiments described herein.
Figure 6:
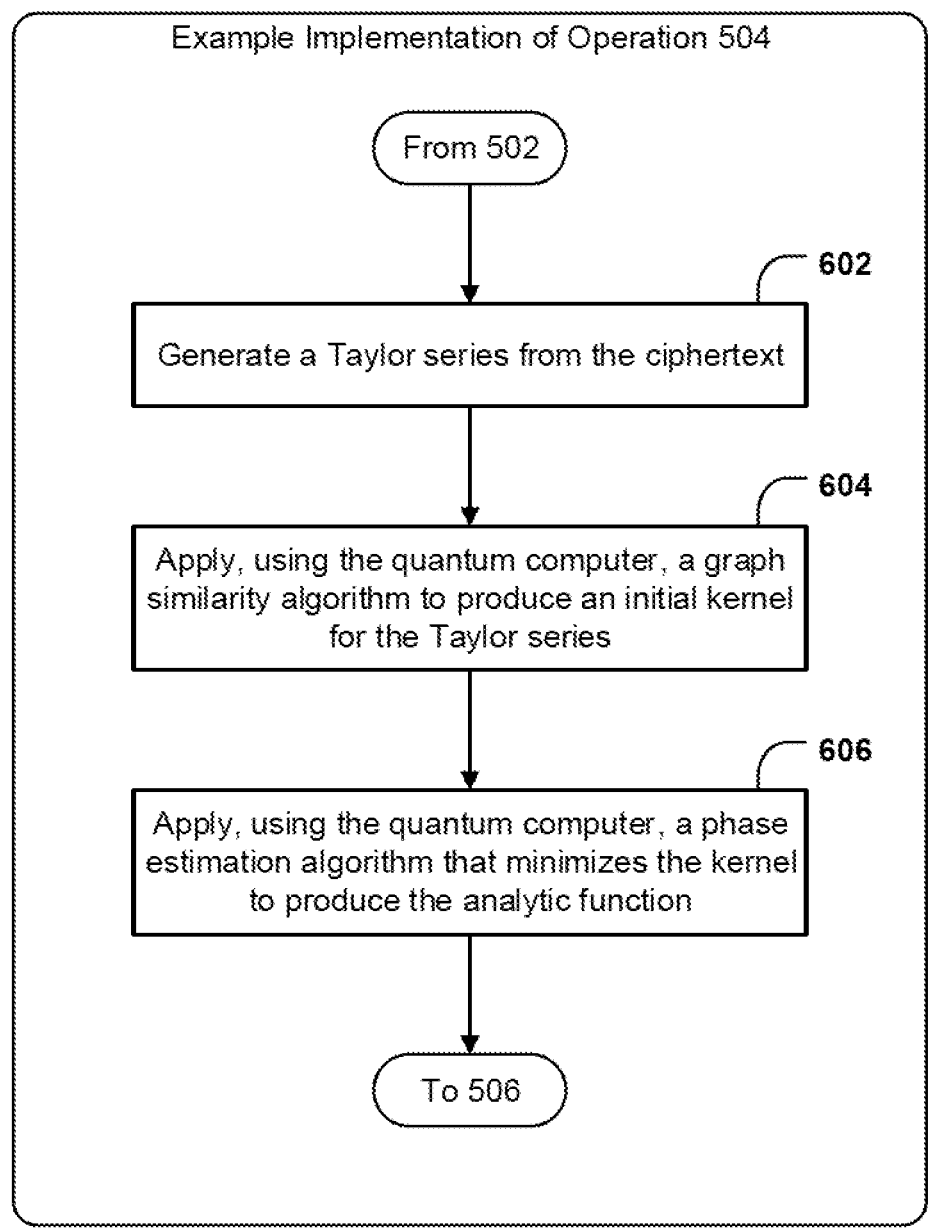
FIG. 6 illustrates an example flowchart for deriving an analytic function from a ciphertext, in accordance with some example embodiments described herein.
Figure 7:
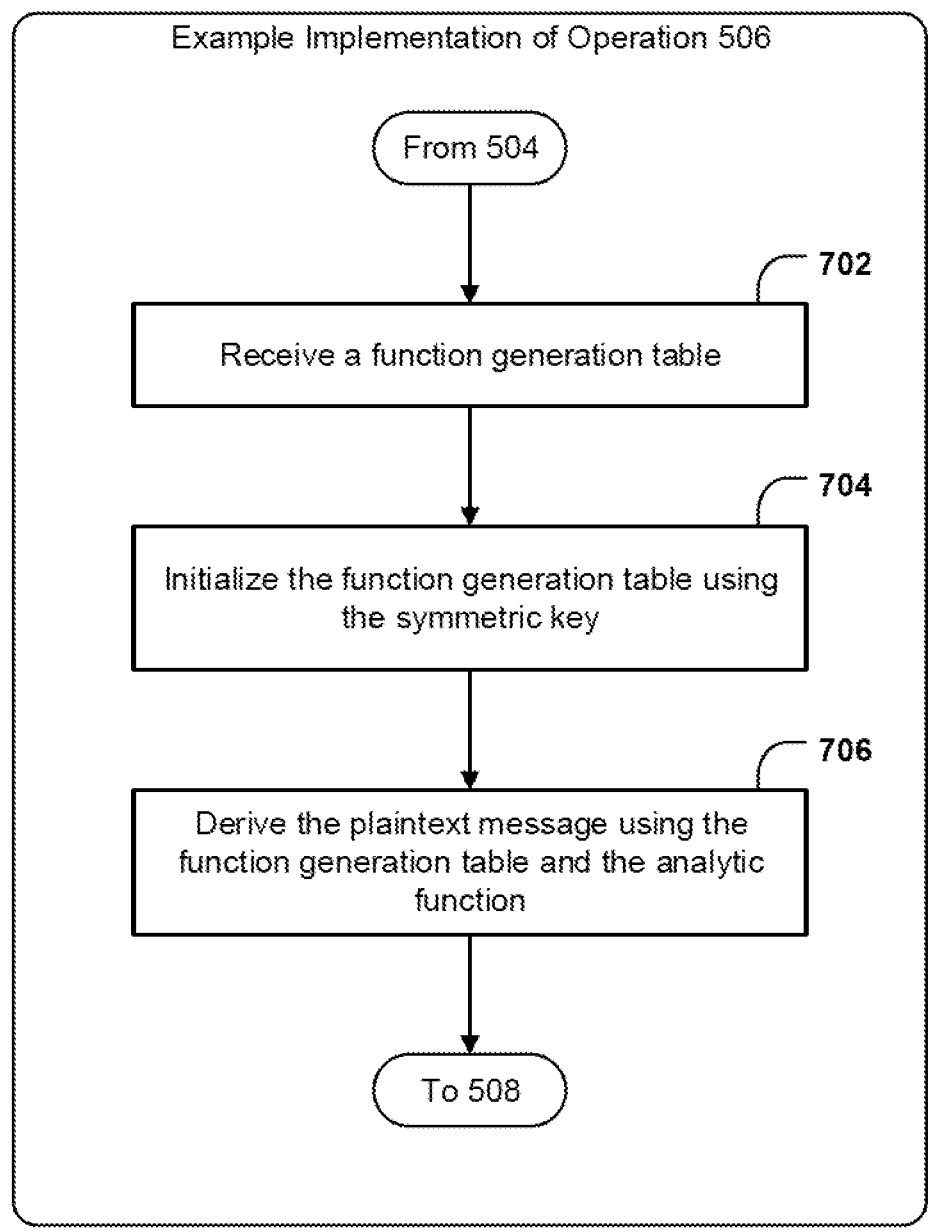
FIG. 7 illustrates an example flowchart for generating a plaintext message using a symmetric key and an analytic function, in accordance with some example embodiments described herein.

Turning next to FIGS. 5-7, the operations illustrated in these flowcharts may, for example, be performed by a device that decrypts a ciphertext that has previously been encrypted in the manner set forth in FIGS. 3 and 4. The apparatus that performs the operations illustrated in FIGS. 5-7 may also be embodied by a system device 104 of a cryptography system 102 shown in FIG. 1, which may be embodied by an apparatus 200, which is shown and described in connection with FIG. 2. However, the cryptography system 102 that performs the operations of FIGS. 5-7 may be the same or different from the cryptography system 102 that performs the operations of FIGS. 3 and 4. In this regard, although the apparatus 200 that performs the encryption operations of FIGS. 3 and 4 need not include or utilize a quantum computer, a quantum computer is necessarily required to complete the set of operations described in connection with FIGS. 5-7, as will become apparent from the following description.

Turning now to FIG. 5, operation 502 illustrates that the apparatus 200 includes means, such as memory 204, communications hardware 206, or the like, for receiving a symmetric key and a ciphertext.

The symmetric key may be retrieved from a memory (e.g., memory 204 or a remote storage device). Alternatively, the symmetric key may be received via communications hardware 206. For instance, the symmetric key may be received from a user interacting with the apparatus 200 (e.g., by the user manually engaging with the apparatus 200 via a user interface, or by the user plugging a USB key or other similar portable storage device into the apparatus 200 and causing transfer of the symmetric key from the USB key or portable storage device to the apparatus 200). As another example, the symmetric key may be received via communications hardware 206 from another device remote from the apparatus 200, such as a third party device (e.g., any of the remote devices 110A-110N shown in FIG. 1).

As with the symmetric key, the ciphertext may also be received in any of a variety of ways. For instance, the ciphertext may be retrieved from a memory (e.g., memory 204 or a remote storage device). Alternatively, the ciphertext may be received via communications hardware 206. For instance, the ciphertext may be received from a user interacting with the apparatus 200 (e.g., by the user manually engaging with the apparatus 200 via a user interface, or by the user plugging a USB key or other similar portable storage device into the apparatus 200 and causing transfer of the plaintext message from the USB key or portable storage device to the apparatus 200). As another example, the ciphertext may be received via communications hardware 206 from another device remote from the apparatus 200, such as a third party device (e.g., any of the remote devices 110A-110N shown in FIG. 1).

As shown in operation 504, the apparatus 200 includes means, such as processor 202, cryptography unit 210, quantum computer 212, or the like, for deriving an analytic function from the ciphertext. A more detailed description of one example implementation of operation 504 is provided in connection with FIG. 6, which will now be described.

Turning to FIG. 6, operation 602 illustrates that the apparatus 200 includes means, such as cryptography unit 210, quantum computer 212, or the like, for generating a Taylor series from the ciphertext. It will be understood that, as previously described, the ciphertext comprises a set of coefficients that describe a Taylor series produced by the Taylor series expansion of an analytic function. Accordingly, generating the Taylor series from the ciphertext comprises converting, by the cryptography unit 210, the set of coefficients comprising the ciphertext into a Taylor series.

Having generated the Taylor series from the ciphertext, operation 604 illustrates that the apparatus 200 includes means, such as cryptography unit 210, quantum computer 212, or the like, for applying a graph similarity algorithm to produce an initial kernel ko for the Taylor series. To do this, the cryptography unit 210 may invoke a quantum computer 212, which may be a physically connected component of the apparatus 200 or a separate quantum computer with which the rest of the apparatus 200 interacts via a communications network (e.g., communications network 108 or the like). Historically, it has been very hard for a computer to derive the analytic function that a Taylor series approximates. The general way to perform this operation would be to plot the Taylor series and then perform a fit to the graph. To perform this fit, some human analysis would be applied to "guess" the type of analytic function (i.e., candidate graph) to which the graph fits. The cryptography unit 210 may thereafter calculate a graph kernel for the graph represented by the Taylor series and the candidate graph. This graph kernel comprises the initial kernel $k_0$. The kernel is a measure of how similar two graphs are to each other. Using classical computing resources, cryptography unit 210 may calculate a graph kernel by computing the inner product of the two graphs. To do this, the cryptography unit 210 may convert the graph produced by the Taylor series and the candidate graph into matrices, which may thereafter be multiplied via the Kronecker product to produce the graph kernel. Because of the computational intensity of classical graph similarity algorithms, it may not be feasible to identify the candidate graph that matches the graph represented by the Taylor series.

However, it has recently been shown that quantum computers are able to perform a quantum graph similarity algorithm at reduced computational complexity. Rossi L, Torsello A, Hancock E R, *Measuring graph similarity through continuous-time quantum walks and the quantum Jensen-Shannon divergence*, Phys Rev E Stat Nonlin Soft Matter Phys. 2015 February; 91(2):022815. doi: 10.1103/PhysRevE.91.022815. Epub 2015 Feb. 23. PMID: 25768560. In embodiments leveraging quantum computer 212 to this end, the quantum computer 212 may, for instance, perform quantum walks over the two graphs and generate the graph kernel based on evaluation of the quantum Jensen-Shannon divergence observed from the quantum walks.

If the graph kernel is 1, then the two graphs are identical, and the candidate graph comprises the analytic function. If the graph kernel is larger, then the two graphs are less similar. Because there are a discrete and countable number of possible candidate graphs (i.e., combinations of analytic functions), these candidate graphs can be viewed as combinatorials for performing a minimization operation, so derivation of the analytic function represented by the Taylor series requires minimizing the graph kernel by identifying the most optimally matching candidate graph.

Accordingly, as shown in operation 606, the apparatus 200 includes means, such as cryptography unit 210, quantum computer 212, or the like, for applying a phase estimation algorithm that minimizes the kernel to produce the analytic function. This minimization problem reduces to the famous traveling salesman problem, wherein given a list of stops and the distances between stops, the goal is to find the shortest possible route that visits each stop once and minimizes the distance travelled. To produce the analytic function to be used for decrypting the ciphertext, instead of stops, the apparatus 200 assigns analytic functions, and instead of a distance, the apparatus 200 assigns a kernel. It has been shown that traveling salesman type problems can be efficiently solved in polynomial time on a quantum computer by using a phase estimation algorithm, as set forth in Srinivasan, Karthik, et al. "Efficient quantum algorithm for solving travelling salesman problem: An IBM quantum experience." *arXiv preprint arXiv:* 1805.10928 (2018). Applying this framework, the kernels between the graph represented by the Taylor series and all possible combinations of candidate graphs are encoded as phases. The quantum computer 212 constructs unitary operators whose eigenvectors are computational basis states and eigenvalues are various combinations of these phases. The quantum computer 212 applies a phase estimation algorithm to certain eigenstates to produce all of the kernels for all of the combinations of candidate analytic functions. Thereafter, quantum computer 212 invokes a quantum search algorithm to find the minimal kernel. The cryptography unit 210 thereafter extracts the analytic function corresponding to the minimal kernel, and this extracted analytic function may thereafter be used in operation 506 for decrypting the ciphertext.

Following derivation of the analytic function from the ciphertext as described in operation 504 and FIG. 6, the procedure thereafter advances to operation 506 to continue with the decryption process.

As shown in operation 506, the apparatus 200 includes means, such as function generator 208 or the like, for generating a plaintext message using the analytic function and the symmetric key. Any of a variety of methods may be used to generate the plaintext message from a symmetric key and an analytic function. One example implementation for doing this utilizes a function generation table, as shown in FIG. 7, which will now be described.

Turning to FIG. 7, operation 702 illustrates that the apparatus 200 includes function generator 208 or the like, for receiving a function generation table. The function generation table may be retrieved by function generator 208 from a memory (e.g., memory 204 or a remote storage device). Alternatively, the function generation table may be received by the function generator 208 via communications hardware 206, either via engagement of a user with the apparatus 200 or via interaction between the apparatus 200 and a separate device (e.g., any of the remote devices 110A-110N shown in FIG. 1). The function generation table may be received from a user via communications hardware 206 by the user manually engaging with the apparatus 200 via a user interface comprising the communications hardware 206 or by the user plugging a USB key or other similar portable storage device into communications hardware 206 of the apparatus 200 and causing transfer of the plaintext message from the USB key or other portable storage device to the apparatus 200. The function generation table may be received via communications hardware 206 from another device, such as any of the remote devices 110A-110N shown in FIG. 1, via a communications network (e.g., communications network 108 shown in FIG. 1). Finally, in embodiments where the symmetric key defines both the analytic function components in each column of the function generation table as well as the ordering within each column, the function generator 208 may generate the function generation table from the symmetric key.

As shown in operation 704, the apparatus 200 includes means, such as function generator 208 or the like, for initializing the function generation table using the symmetric key. As noted previously, in some embodiments, the function generator 208 may initialize the function generation table by re-arranging, based on the symmetric key, which analytic function components are contained in the fields identified by the column-row pairs in the function generation table. In this regard, a portion of the symmetric key may correspond to each column of the function generation table, such that the portion of the symmetric key for a given column defines the ordering of the analytic function components in that column. The function generation table defines the subset of constituent analytic function components that are in each column, and this portion of the symmetric key with the subset of constituent analytic function components together define the contents and ordering of each column in the function generation table. In some embodiments, this portion of the symmetric key may itself define the subset of constituent analytic function components in the column as well as the ordering thereof, such that this portion of the symmetric key essentially defines the entirety of its corresponding column of the function generation table. Collectively, the symmetric key therefore may be used to define how to re-arrange the analytic function component contained within each field identified by each column-row pair in the function generation table.

As shown in operation 706, the apparatus 200 includes means, such as function generator 208 or the like, for deriving the plaintext message using the function generation table and the analytic function. In some embodiments, deriving the plaintext message includes the function generator 208 partitioning the analytic function into a series of analytic function components. For each analytic function components, the function generator 208 may select an appropriate column-row pair from the function generation table. In this regard, the function generator 208 may select a column for the column-row pair based on an ordering of the analytic function components within the series of analytic function components and an ordering of the column within the function generation table. For instance, the first analytic function components in the series may correspond to the first column in the function generation table, the second analytic function components may correspond to the second column, and so forth (of course, it will be understood that any other appropriate correspondence may be assigned as well, and in some embodiments the assignment of analytic function components to columns may be made by the function generator 208 based on additional data stored in the symmetric key). The function generator 208 may select, within the appropriate column a column-row pair that identifies a field containing the analytic function component. Following selection of an appropriate column-row pair for the analytic function component, the function generator 208 may identify the offset of the row for the column-row pair. The numerical value of that offset may be represented as a bit group. From the numerical value of the offset of the row, the function generator 208 may derive this bit group, which will comprise the plaintext corresponding to the analytic function component. Essentially, this process comprises a reversal of the process set forth above in connection with operation 406 of FIG. 4.

Following derivation of the plaintext corresponding to each of the analytic function components in the series of analytic function components, the function generator 208 may concatenate all of the derived plaintext to recreate the original plaintext message. The procedure thereafter returns to operation 508 to continue with the decryption process.

The final operation illustrated in FIG. 5 is operation 508, which illustrates that the apparatus 200 includes means, such as memory 204, communications hardware 206, or the like, for outputting the plaintext message. For instance, the plaintext message may be stored in memory 204, stored in a separate storage device (e.g., storage device 106 shown in FIG. 1 or a remote storage device), or may be transmitted via communications hardware 206 to a user, to a portable memory device (e.g., a USB key or the like), or transmitted to a separate device (e.g., any of remote devices 110A-110N).

The above procedures, which illustrate the encryption of a plaintext message into a ciphertext and the decryption of the ciphertext into the plaintext message, provide unique cryptographic benefits for a post-quantum world. As has been described previously, deriving an analytic function from a Taylor series expansion is not possible using classical computing resources. Thus, although the forthcoming ubiquity of quantum computing may expose new vulnerabilities in traditional forms of asymmetric key encryption (e.g., RSA, DH, ECC, or the like), the procedures set forth herein provide a new classical-quantum asymmetric key encryption paradigm designed to require the use of quantum computing, and therefore minimize the risk that a new quantum algorithm could ever expose a critical vulnerability.

Today, reliance on cloud services and ubiquitous network connectivity ensures that, as a practical matter, sensitive data is always potentially exposed to third parties. Certain types of data must be stored for indefinite periods of time, and as the field of cryptography advances and new quantum algorithms emerge that reveal new vulnerabilities in existing security infrastructure, it is imperative to utilize tools that mitigate the possible risk that encrypted data is revealed. Example implementations described herein provide enhanced forward security mitigating these concerns.

FIGS. 3-7 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for classical-quantum encryption, the method comprising:
   receiving, by communications hardware, a symmetric key and a plaintext message;
   generating, by a function generator, an analytic function using the symmetric key and the plaintext message;
   computing, by a cryptography unit, a Taylor series expansion of the analytic function;
   selecting, by the cryptography unit, a set of coefficients that describe a Taylor series produced by the Taylor series expansion;
   computing, by the cryptography unit, a ciphertext based on the Taylor series expansion of the analytic function, wherein the ciphertext comprises the selected set of coefficients; and
   outputting the ciphertext, wherein outputting the ciphertext includes:
      storing the ciphertext in a memory, or
      transmitting the ciphertext to a remote device by the communications hardware.

2. The method of claim 1, wherein generating the analytic function includes:
   receiving a function generation table having a set of columns and a set of rows, wherein each specific column-row pair in the function generation table identifies a field containing an analytic function component;
initializing the function generation table using the symmetric key; and
deriving the analytic function using the function generation table and the plaintext message.

3. The method of claim 2, wherein receiving the function generation table comprises:
retrieving the function generation table from a memory;
receiving the function generation table by the communications hardware; or
generating the function generation table.

4. The method of claim 2, wherein initializing the function generation table includes:
re-arranging, based on the symmetric key, which analytic function components are contained in fields identified by column-row pairs in the function generation table.

5. The method of claim 2, wherein deriving the analytic function includes:
partitioning the plaintext message into a series of bit groups;
for each bit group,
selecting an appropriate column-row pair from the function generation table, wherein a column for the column-row pair is selected based on an ordering of the bit group within the series of bit groups and an ordering of the column within the function generation table, and wherein a row for the column-row pair is selected based on a numerical value of the bit group, and
selecting an analytic function component contained in a field identified by the appropriate column-row pair; and
concatenating all selected analytic function components to produce the analytic function.

6. An apparatus for classical-quantum encryption, the apparatus comprising:
communications hardware configured to receive a symmetric key and a plaintext message;
a function generator configured to generate an analytic function using the symmetric key and the plaintext message; and
a cryptographic unit configured to:
compute a Taylor series expansion of the analytic function,
select a set of coefficients that describe a Taylor series produced by the Taylor series expansion, and
compute a ciphertext based on the Taylor series expansion of the analytic function, wherein the ciphertext comprises the selected set of coefficients,
wherein the communications hardware is further configured to output the ciphertext, wherein outputting the ciphertext includes:
storing the ciphertext in a memory, or
transmitting the ciphertext to a remote device by the communications hardware.

7. The apparatus of claim 6, wherein the function generator is further configured to:
receive a function generation table having a set of columns and a set of rows, wherein each specific column-row pair in the function generation table identifies a field containing an analytic function component,
initialize the function generation table using the symmetric key, and
derive the analytic function using the function generation table and the plaintext message to generate the analytic function.

8. The apparatus of claim 7, wherein the function generator is further configured to:
retrieve the function generation table from a memory,
receive the function generation table via communications hardware, or
generate the function generation table to receive the function generation table.

9. The apparatus of claim 7, wherein the function generator is configured to:
re-arrange, based on the symmetric key, which analytic function components are contained in fields identified by column-row pairs in the function generation table to initialize the function generation table.

10. The apparatus of claim 7, wherein the function generator is configured to:
partition the plaintext message into a series of bit groups;
for each bit group,
select an appropriate column-row pair from the function generation table, wherein a column for the column-row pair is selected based on an ordering of the bit group within the series of bit groups and an ordering of the column within the function generation table, and wherein a row for the column-row pair is selected based on a numerical value of the bit group, and
select an analytic function component contained in a field identified by the appropriate column-row pair; and
concatenate all selected analytic function components to derive the analytic function.

11. A computer program product for classical-quantum encryption, the computer program product comprising at least one non-transitory computer-readable storage medium storing software instructions that, when executed, cause an apparatus to:
receive a symmetric key and a plaintext message;
generate an analytic function using the symmetric key and the plaintext message;
compute a Taylor series expansion of the analytic function;
select a set of coefficients that describe a Taylor series produced by the Taylor series expansion;
compute a ciphertext based on the Taylor series expansion of the analytic function, wherein the ciphertext comprises the selected set of coefficients; and
output the ciphertext, wherein outputting the ciphertext includes:
storing the ciphertext in a memory, or
transmitting the ciphertext to a remote device.

12. The computer program product of claim 11, wherein the software instructions, when executed, cause the apparatus to generate the analytic function by:
receiving a function generation table having a set of columns and a set of rows, wherein each specific column-row pair in the function generation table identifies a field containing an analytic function component;
initializing the function generation table using the symmetric key; and
deriving the analytic function using the function generation table and the plaintext message.

13. The computer program product of claim 12, wherein the software instructions, when executed, cause the apparatus to receive the function generation table by:
retrieving the function generation table from a memory;
receiving the function generation table via communications hardware; or
generating the function generation table.

14. The computer program product of claim 12, wherein the software instructions, when executed, cause the apparatus to initialize the function generation table by:
- re-arranging, based on the symmetric key, which analytic function components are contained in fields identified by column-row pairs in the function generation table.

15. The computer program product of claim 12, wherein the software instructions, when executed, cause the apparatus to derive the analytic function by:
- partitioning the plaintext message into a series of bit groups;
- for each bit group,
    - selecting an appropriate column-row pair from the function generation table, wherein a column for the column-row pair is selected based on an ordering of the bit group within the series of bit groups and an ordering of the column within the function generation table, and wherein a row for the column-row pair is selected based on a numerical value of the bit group, and
    - selecting an analytic function component contained in a field identified by the appropriate column-row pair; and
- concatenating all selected analytic function components to produce the analytic function.

16. The method of claim 1, wherein selecting the set of coefficients comprises:
- determining a number of coefficients to be selected based on a portion of the symmetric key,
- wherein the set of coefficients is selected in accordance with the determined number of coefficients.

17. The apparatus of claim 8, wherein the cryptographic unit is configured to determine a number of coefficients to be selected based on a portion of the symmetric key to select the set of coefficients, wherein the set of coefficients is selected in accordance with the determined number of coefficients.

18. The computer program product of claim 11, wherein the software instructions, when executed, cause the apparatus to select the set of coefficients by:
- determining a number of coefficients to be selected based on a portion of the symmetric key,
- wherein the set of coefficients is selected in accordance with the determined number of coefficients.

* * * * *